United States Patent [19]

Winn, Jr.

[11] 3,956,463

[45] May 11, 1976

[54] PRODUCTION OF PHOSPHORUS OXYHALIDE

[75] Inventor: B. Meredith Winn, Jr., Richmond, Va.

[73] Assignee: Mobil Oil Corporation, New York, N.Y.

[22] Filed: Apr. 2, 1975

[21] Appl. No.: 564,399

[52] U.S. Cl. ............................. 423/300; 423/304
[51] Int. Cl.$^2$ ................. C01B 25/10; C01B 25/12
[58] Field of Search ........................... 423/300, 304

[56] References Cited
UNITED STATES PATENTS

| | | | |
|---|---|---|---|
| 2,741,542 | 4/1956 | Taylor | 423/300 |
| 3,052,520 | 9/1962 | Draeger et al. | 423/300 |

*Primary Examiner*—Oscar R. Vertiz
*Assistant Examiner*—Gregory A. Heller
*Attorney, Agent, or Firm*—Charles A. Huggett; Michael G. Gilman

[57] ABSTRACT

Improvement in the oxygen oxidation of phosphorus trihalides, particularly phosphorus trichloride, to phosphorus oxyhalide, particularly oxychloride, by introducing phosphorus trihalide and gaseous oxygen into the bottom of an elongated, substantially vertical reaction zone, passing said phosphorus trihalide and oxygen upwardly through said zone while reacting such together; withdrawing a portion of the upwardly flowing reaction mixture from an intermediate point in said zone; introducing oxygen into admixture with said withdrawn admixture and cooling, agitating and reacting such; returning said admixture reaction mass to said elongated reaction zone; and recovering substantially pure phosphorus oxyhalide from the downstream end of said reaction zone.

4 Claims, 1 Drawing Figure

U.S. Patent   May 11, 1976   3,956,463
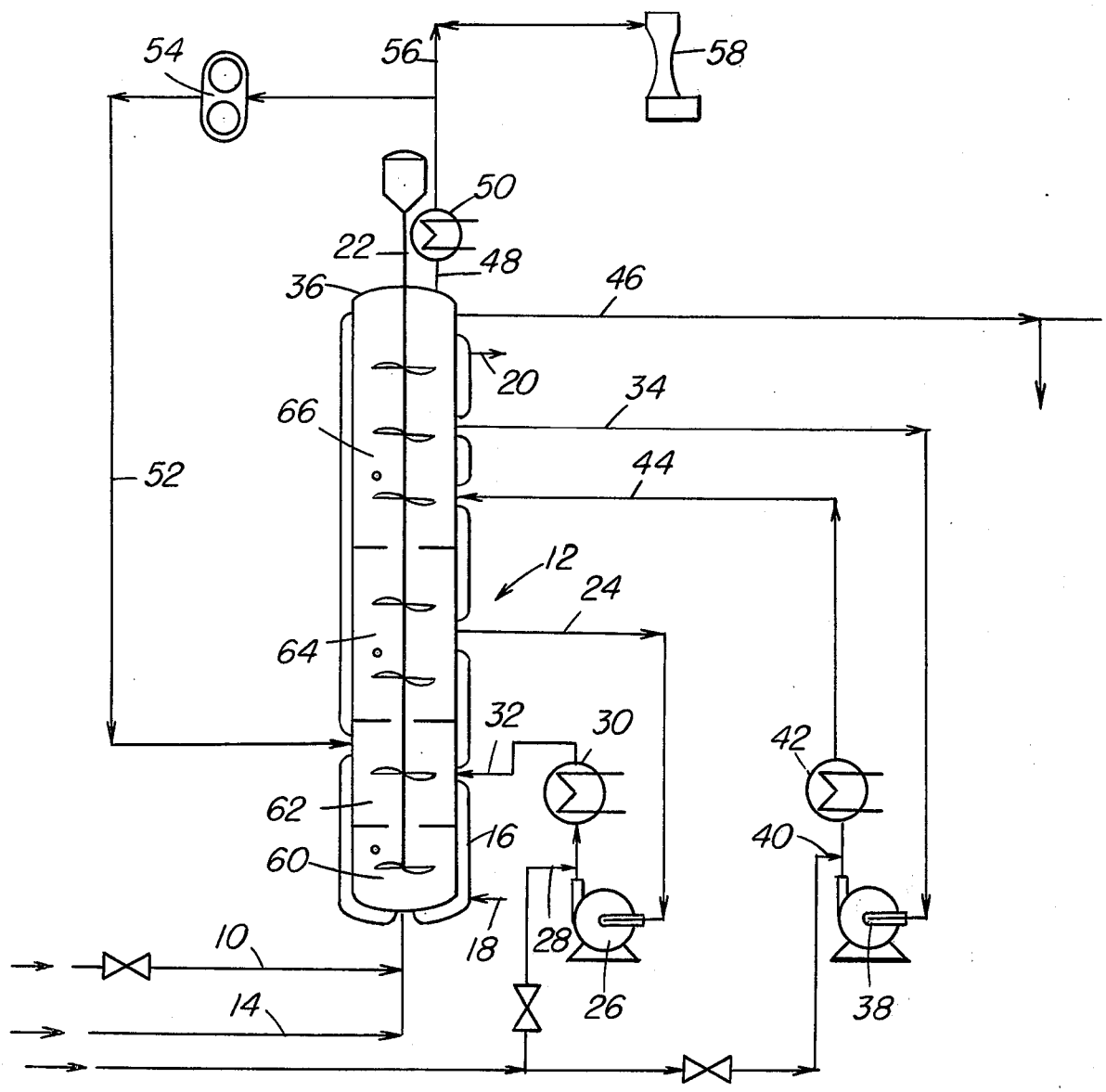

PRODUCTION OF PHOSPHORUS OXYHALIDE

This invention relates to the conversion of phosphorus trihalides to phosphorus oxyhalides by oxygen oxidation. It more particularly refers to carrying out such reaction without forming an explosive mixture.

The oxygen oxidation of phosphorus trihalide, particularly phosphorus trichloride, to phosphorus oxyhalide, particularly oxychloride, is well known and has been commercially practiced for some time. It is known that this oxidation proceeds quite rapidly in an exothermic manner. One particular problem resides in the fact that an explosive mixture of phosphorus trihalide and gaseous oxygen forms in an oxygen containing vapor space above a liquid reaction mixture containing at least about 50% phosphorus trihalide. It is obvious that one way to avoid such explosive mixtures is to dilute the reaction mixture so that it contains less than 50% phosphorus trihalide, resolve the product into diluent and product and recycle diluent. This requires the additional expense of product separation and recycle. If the diluent is a heel of product it improves the economics but it still adds capital and pumping costs.

It would, of course, be desirable to carry out this reaction in such manner as to reduce or eliminate the formation of explosive mixtures while at the same times converting substantially all of the phosphorus trihalide in a single pass, and this is the principal object of this invention.

Another object of this invention is to provide a novel process for continuously converting phosphorus trichloride to phosphorus oxychloride.

A further object is to provide means for controlling the exothermic heat released in the oxygen oxidation of phosphorus trichloride to phosphorus oxychloride.

Other and additional objects of this invention will become apparent from a consideration of this entire disclosure including the drawing and claims hereof.

The single FIGURE of the drawing is a schematic front elevation of apparatus suitable for carrying out this invention.

In accord with and fulfilling these objects, one aspect of this invention resides in a process of reacting phosphorus trihalide with oxygen to form phosphorus oxyhalide by utilizing an elongated reaction zone maintained hydrostatically full, that is with substantially no vapor phase above a liquid reaction mass, to utilize multiple streamwise oxygen injections, to maximize agitation so as to reduce oxygen bubble size to a minimum and substantially prevent oxygen bubble conglomoration; and to provide substantially increased reaction mass cooling by intermediate withdrawal of reaction mass and external cooling thereof. It is preferred to downstream inject oxygen into the intermediate withdrawn reaction mass prior to cooling thereof.

Since this oxidation is remarkably exothermic, and since it is most desirable to minimize passage of phosphorus trihalide from the liquid into the vapor phase and thereby minimize the explosion hazard, a great effort should be undertaken to provide maximum cooling at and immediately down stream of points of oxygen addition to the system. Where the halide reactant is phosphorus trichloride, and this is preferred, the stoichiometry of the system is such that, on a weight basis, about 10 times as much phosphorus trichloride as oxygen is required. The reaction is very rapid, phosphorus trichloride absorbing oxygen out of its gas bubbles at a very high rate. Therefore, it is preferred, within limits of available cooling, to introduce most of the oxygen with the phosphorus trihalide at the upstream end of the reaction zone and to react these together in the shortest possible time so as to reduce the concentration of phosphorus trichloride in the reaction mixture to below 50%, the explosive limit. This is accomplished in this invention in the first 5 to 20% of the reaction zone. One technique of aiding the cooling is to use liquid oxygen for at least the initial oxygen feed. It can also be accomplished by the use of intensive heat exchange cooling at the point of initial reactant mixing. If excess oxygen is introduced into the system, the proportion thereof over stoichiometric will be taken over head from the down stream end of the reaction zone and may be vented or recycled as desired.

The reaction zone is suitably a vertical column which may have internal baffles to restrict back-mixing. Agitation and cooling are provided over the entire length of the reaction zone. It is preferred to have more intensive cooling at the bottom or feed end of the column, while providing for intensive agitation at the top or discharge end of the column.

Referring now to the drawing, phosphorus trihalide 10 is fed to a reaction zone 12 along with oxygen 14. A cooling jacket 16 is provided about the reaction zone and internal cooling coils (not shown) may be employed. The cooling jacket 16 suitably has a cold water inlet 18 and exit 20. An agitator 22 is provided along the whole length of the reaction zone. A first portion of the reaction mass 24 is withdrawn from the reaction zone 12 at an intermediate point. It is pressurized by a pump 26, admixed with additional oxygen downstream of the pump in a zone of high turbulence which may be induced by the pump discharge 28, the admixture cooled 30 and returned 32 to an upstream intermediate point in the reaction zone 12. The return point 32 may be at or below withdrawal point 12, but suitably above the bottommost reaction compartment.

In a preferred embodiment at least one additional portion 34 of the reaction mass is withdrawn from the reaction zone 12 intermediate, the first stream withdrawal 24 and the downstream end 36 of the reaction zone. This second portion is pressurized 38, admixed with supplemental oxygen 40 down-stream of the pump in a turbulent zone and cooled 42 before it is returned 44 to the reaction zone 12 upstream of its withdrawal point similar to the procedure set forth with respect to the first withdrawal.

The product 46 produced by this process is substantially pure phosphorus oxyhalide. It is taken from the down stream end 36 of the reaction zone 12. Excess oxygen comes overhead at 48, may pass through a reflux condenser 50 and is then recycled 52 by means of a suitable compressor 54. A pure vent stream 56 is suitably removed through a scrubber 58.

The following Example illustrates the practice of this invention without being limiting upon the scope thereof. Parts and percentages are by weight unless expressly stated to be on some other basis.

EXAMPLE

A feed is prepared by admixing 14.7 parts per minute of phosphorus trichloride and 0.75 parts per minute of oxygen which is immediately fed to the base of a cooled vertical reaction zone. Cooling water at 30°C is fed to a jacket around the reaction zone. The temperature in the base of the reaction zone is about 90°C. A first portion of the reaction mass is removed from the reaction zone at a rate of about 40 parts per minute, mixed with 0.4 parts of additional oxygen per minute and returned to the reaction zone after having been cooled by indirect heat exchange with water at 30°C. A second portion of the reaction mass is removed from the reaction zone at about 40 parts per minute, mixed with 0.25 parts of supplemental oxygen per minute, indirectly cooled with 30°C water and returned to the reaction zone. The product, phosphorus oxychloride, comes overhead at about 40°C at a rate of 16.08 parts per minute in 99.6% purity. The reaction zone length is about 10 feet. A recycle rate of 0.4 part per minute is used. Oxygen loss to scrubber is 0.02 parts per minute. Approximate $PCL_3$ concentrations are: in the bottommost portion of the reactor 60, 70%; next compartment up 62, 30%, 3rd compartment up 64, 5%; uppermost compartment 66, 0.4%.

It is important in the practice of this invention to cool the system sufficiently to remove about 800 to 1,000 BTU's per pound of phosphorus trihalide reacting. Since it is desirable to react away the first 50% of the phosphorus trihalide as fast as possible, at least half this cooling requirement is concentrated in the first 20 to 30% of reaction zone. It is appropriate to maintain the initial reaction zone at about 70° to 90°C. Concentrated cooling is also required at each intermediate oxygen addition point.

It is suitable to withdraw and return at a rate of about 1 to 10 pounds per pound of phosphorus trihalide feed. Final reaction zone temperatures should be about 25° to 50°C.

What is claimed is:

1. In the process of converting phosphorus trihalide to phosphorus oxyhalide by admixing and reacting such with oxygen under cooling conditions; the improvement, whereby effectively cooling the reaction mixture and substantially eliminating the hazard of explosion which occurs in a vapor containing oxygen over a liquid containing at least about 50% phosphorus trihalide, which comprises feeding a mixture of said phosphorus trihalide and between 50% and less than 100% of the stoichiometrically required amount of oxygen to the base of an agitated, elongated, substantially vertical reaction zone; reacting said phosphorus trihalide and said oxygen in an initial stage of said reaction zone under cooling conditions to an extent of at least about 50% of the fed phosphorus trihalide; thereafter withdrawing at least a portion of the reaction mixture from said reaction zone intermediate between said initial stage and the upper end of said reaction zone; pressurizing and agitating said withdrawn reaction mixture; admixing such with supplemental oxygen sufficient to cumulatively consist of at least about the stoichiometrically required oxygen; cooling said admixture; returning said admixture to said reaction zone; maintaining substantially no vapor space in those areas of said reaction zone where the concentration of phosphorus trihalide in liquid in those areas is at least about 50%; and recovering substantially pure phosphorus oxyhalide from the downstream end of said reaction zone.

2. The improved process claimed in claim 1 wherein said halide is chloride.

3. The improved process claimed in claim 1 including providing at least two intermediate withdrawals of reaction mixture agitating each, admixing each with supplemental oxygen, cooling such and returning such to said reaction zone upstream of said withdrawal.

4. The improved process claimed in claim 1 including feeding oxygen as a liquid.

* * * * *